United States Patent
Sharma et al.

[11] Patent Number: 6,090,319
[45] Date of Patent: Jul. 18, 2000

[54] COATED, LONG FIBER REINFORCING COMPOSITE STRUCTURE AND PROCESS OF PREPARATION THEREOF

[75] Inventors: Subodh K. Sharma, Minnesota City; Eric V. Lee, Stockton; Timothy A. Regan, Lewiston; Jeffrey N. Compton, Winona; David W. Eastep, Winona; Dale K. Roland, Winona; Michael L. Wesley, Dover; Stephen T. Bowen, La Crescent; Randy J. Skarlupka, Winona, all of Minn.

[73] Assignee: Ticona Celstran, Inc., Winona, Minn.

[21] Appl. No.: 08/783,642

[22] Filed: Jan. 14, 1997

[51] Int. Cl.[7] .................................................. B28B 3/20
[52] U.S. Cl. ................... 264/108; 264/171.1; 264/176.1
[58] Field of Search ..................................... 264/108, 136, 264/174, 255, 275, 279, 331, 171.1, 176.1, 166, 167; 428/375, 542, 902, 397, 413, 417, 418, 483, 516, 261–263, 422, 419, 421, 412, 414, 34.4–34.6, 36.3, 36.9, 267, 268, 290, 408, 378, 379, 383, 384, 386; 425/148, 205, 327, 376.1, 377, 110–113, 130, 131.1, 145

[56] References Cited

U.S. PATENT DOCUMENTS

| | | | |
|---|---|---|---|
| Re. 32,772 | 10/1988 | Hawley | 264/108 |
| 4,252,696 | 2/1981 | McQuarrie | 260/16 |
| 4,312,917 | 1/1982 | Hawley | 428/375 |
| 4,654,255 | 3/1987 | Kojima et al. | 428/261 |
| 4,853,279 | 8/1989 | Shibata et al. | 428/267 |
| 4,863,541 | 9/1989 | Katz et al. | 156/158 |
| 4,892,600 | 1/1990 | Beever | 156/166 |
| 4,937,028 | 6/1990 | Glemet et al. | 264/136 |
| 4,938,823 | 7/1990 | Balazek et al. | 156/166 |
| 4,956,039 | 9/1990 | Olesen et al. | 156/180 |
| 5,076,872 | 12/1991 | Nakagawa et al. | 428/372 |
| 5,165,941 | 11/1992 | Hawley | 425/148 |
| 5,206,085 | 4/1993 | Nakagawa et al. | 428/372 |
| 5,358,680 | 10/1994 | Boissonnat et al. | 264/177.2 |
| 5,534,210 | 7/1996 | Shirai et al. | 264/171.13 |
| 5,556,673 | 9/1996 | Giraud | 428/34.4 |

*Primary Examiner*—Lynette R. F. Smith
*Assistant Examiner*—Brenda G. Brumback

[57] ABSTRACT

A process for the continuous preparation of a coated, long fiber reinforcing composite structure suitable for the preparation of shaped articles. The process is characterized by impregnating a plurality of continuous lengths of reinforcing fiber strands with a first thermoplastic resin material while continuously drawing the fiber strands to produce a long fiber reinforcing composite structure followed by coating a second thermoplastic resin material containing additives onto the long fiber reinforcing composite structure to produce a coated, long fiber reinforcing composite structure. The coating additives may be selected from mineral reinforcing agents, lubricants, flame retardants, blowing agents, foaming agents, ultraviolet light resistant agents, heat sensitive pigments, etc. The coated, long fiber reinforcing composite structure prepared according to the process is suitable for the preparation of shaped articles exhibiting good physical and chemical properties.

21 Claims, 1 Drawing Sheet

COATED, LONG FIBER REINFORCING COMPOSITE STRUCTURE AND PROCESS OF PREPARATION THEREOF

FIELD OF THE INVENTION

The present invention relates to coated, long fiber reinforcing composite structure and a process for the preparation thereof. The process of preparation eliminates the requirement of combining selected additives such as pigments, reinforcing agents, flame retardants, etc. to the structure during or after fabrication thereof into shaped articles.

BACKGROUND OF THE INVENTION

Long fiber reinforcing composite structures are characterized as continuous fiber strands of material impregnated with a thermoplastic resin material, pelletized for easy handling, and molded into shaped articles. The shaped articles, ranging for racks for recreation vehicles to bicycle frames, exhibit good impact strength and stiffness due to unidirectional orientation of the reinforcing fiber strands in the shaped article.

Long fiber reinforcing composite structures suitable for the preparation of shaped articles exhibiting good impact strength and stiffness may be prepared according to U.S. Pat. No. Re. 32,772 to Hawley, incorporated herein by reference. Hawley describes a process wherein a mass of thermoplastic resin is extruded through a stationary impregnation die onto a plurality of continuous lengths of reinforcing fiber strands passing through the die to produce a cylindrical-shaped structure. Simultaneously, the resin material is extruded through the die and the reinforcing fibers are pulled through the die at rates sufficient to cause thorough impregnation of individual fiber strands with resin material. The resulting long fiber reinforcing composite structure, described in U.S. Pat. No. 4,312,917 to Hawley, incorporated herein by reference, may be cut into individual inserts, placed into a two-piece stationary mold connected to an extruder, wherein a thermoplastic resin is heated and injected into the mold to provide a coating of resin on the cylindrical inserts to produce a compound composite structure.

Hawley's process for placing a coating of thermoplastic resin on the long fiber reinforcing composite structure has resulted in increased labor and insufficient production of compound composite structures to meet the requirements of manufactures of reinforced thermoplastic shaped articles prepared therefrom.

In an attempt to overcome the labor intensive process of Hawley, and to enhance the appearance as well as the physical and chemical properties of shaped articles prepared from the long fiber reinforcing composite structure, pellets thereof have been physically mixed with additives materials, and the resulting product molded into shaped articles. Generally, the desired additive materials were cut into pellets, physically mixed with long fiber reinforcing composite structure pellets, and molded into the shaped articles. This physically mixing process has failed to provide suitable molding materials. Due to certain incompatibilities between the two substances, perhaps shape, density and pellet size, uniform physical mixtures of the long fiber reinforcing composite structure and additives have been difficult to prepare. Typically, non-uniform blends prepared from these mixtures have resulted in shaped articles exhibiting localized surface areas containing high or low concentrations of either component.

Another process for incorporating additives into the long fiber reinforcing composite structure prior to the fabrication of shaped articles therefrom requires the addition of the additive to the impregnation thermoplastic resin. However, due to the high temperatures required to melt some of the resins to ensure proper impregnation of the fiber strands, sometimes approaching the degradation temperature of the resins, temperature sensitive additives typically degraded and emitted volatile vapors during the heating and extrusion processes.

SUMMARY OF THE INVENTION

The present invention is directed to a process for the continuous preparation of a coated, long fiber reinforcing composite structure suitable for the preparation of shaped articles, characterized by the steps of:

a. extruding a mass of a first thermoplastic resin material in a flowable state having no discrete shape into and longitudinally through an elongated, first stationary die having no relatively movable components, said die having a continuous, fully open central passage extending longitudinally therethrough, and a plurality of lobes projecting radially inwardly into said central passage from spaced apart locations along the length of the inside, opposite side walls of said central passage in interleaving relation to each other to form a convoluted passage through which said first thermoplastic resin material flows;

b. simultaneously introducing a plurality of continuous lengths of reinforcing fiber strands into said first die central passage at different locations therein;

c. separately passing each of said fiber strands longitudinally within and along the length of said central passage over and between said interleaving lobes in the presence of said flowing mass of first thermoplastic resin material to thoroughly contact and impregnate each of said fiber strands with said first thermoplastic resin material to produce a long fiber reinforcing composite structure;

d. drawing the long fiber reinforcing composite structure from said first die longitudinally thereto, wherein the composite structure is characterized as containing continuous fiber strands extending in said first thermoplastic resin material generally parallel to the longitudinal axis of the structure;

e. extruding a mass of a second thermoplastic resin material and an additive material to produce a second thermoplastic resin-additive material, wherein said second thermoplastic resin-additive material is in a flowable state having no discrete shape, into and longitudinally through an elongated, second stationary die having no relatively movable components, said die having a continuous, fully open central passage extending longitudinally therethrough to form a passage through which said second thermoplastic resin-additive material flows;

f. simultaneously introducing the long fiber reinforcing composite structure into said second stationary die central passage;

g. contacting and coating the long fiber reinforcing composite structure with the second thermoplastic resin-additive material to produce a coated, long fiber reinforcing composite structure, wherein the first and second thermoplastic resin materials are bonded at the first and second thermoplastic resin material interface;

h. drawing the coated, long fiber reinforcing composite structure from the second die; and i. cutting the coated, long fiber reinforcing composite structure into pellets.

The present invention is also directed to a coated, long fiber reinforcing composite structure characterized as a long fiber reinforcing composite core member comprised of a first thermoplastic resin material having a plurality of continuous fiber strands imbedded and extending therein generally parallel to the longitudinal axis of the core member; a thermoplastic coating member comprised of a second thermoplastic resin material and an additive material, wherein the coating member surrounds the core member; and an intermediate mixing zone between the core and coating members which bonds the first and second thermoplastic resin materials.

BRIEF DESCRIPTION OF THE DRAWINGS

While the specification concludes with claims particularly pointing out and distinctly claiming the present invention, the invention may be better understood from the following description in conjunction with the accompanying drawings in which:

Detailed Description of the Invention

In accordance with the present invention there is described a coated, long fiber reinforcing composite structure as well as a process for the preparation thereof. The process is useful for incorporating additives into long fiber reinforcing composite structure that cannot be added to thermoplastic resins utilized to impregnate long fiber reinforcing strands. The impregnation step of the process requires a resin exhibiting low viscosity and high flow properties to ensure complete impregnation of the individual fiber strands. Since many additives will increase the viscosity of the resin, decreasing flow and desirable impregnation properties, it is disadvantageous to incorporate such additives into the impregnation resin. However, it is possible to incorporate these viscosity-increasing additives as well as other additives into the long fiber reinforcing composite structures after the impregnation step has been completed by way of the novel process of the present invention.

Generally, the invention is a pultrusion process for the continuous preparation of a long fiber reinforcing composite thermoplastic structure characterized by the steps of extruding a mass of a first thermoplastic resin material in a flowable state into an impregnation die while simultaneously introducing a plurality of continuous lengths of reinforcing fiber strands into the die, contacting and impregnating each fiber strand with the first thermoplastic resin material to provide a long fiber reinforcing composite structure, the improvement comprising the steps of:

a. heating a second thermoplastic resin material and an additive material to a temperature to produce a flowable second thermoplastic resin-additive material blend without degrading the additive material in the blend;

b. extruding the second thermoplastic resin-additive material blend into a stationary coating die having no relatively movable components, said coating die having a continuous, fully open central passage extending longitudinally therethrough, opposite side walls of said central passage through which said second thermoplastic resin-additive material blend flows;

c. simultaneously introducing the long fiber reinforcing composite structure into said coating die central passage;

d. contacting the long fiber reinforcing composite structure with the second thermoplastic resin-additive material blend to form an outer coating of second thermoplastic resin-additive material blend on the long fiber reinforcing composite structure to produce a coated, long fiber reinforcing composite structure;

e. drawing the coated, long fiber reinforcing composite structure from the coating die; and f. cutting the coated, long fiber reinforcing composite structure into pellets.

Figure 1:
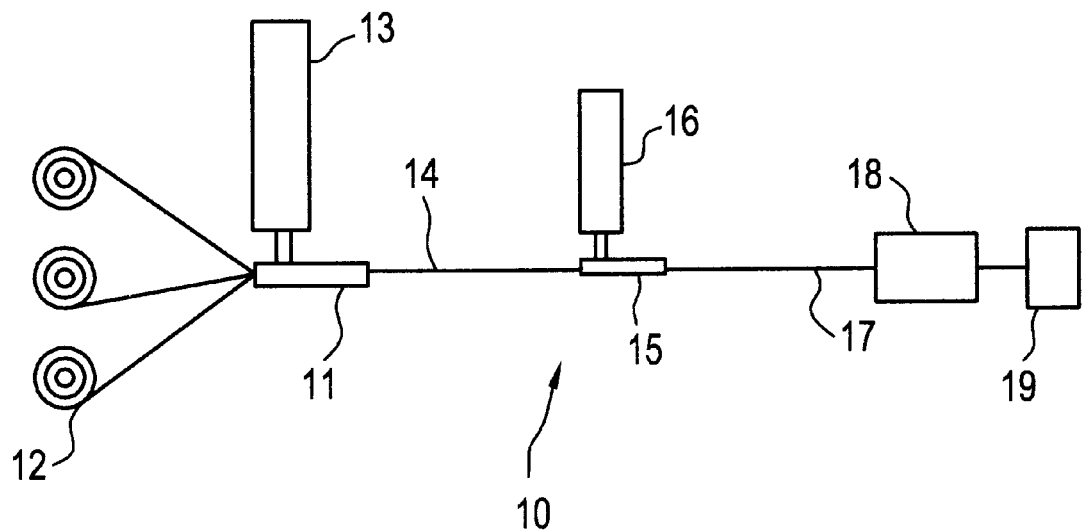
FIG. 1 is a schematic view in elevation of an apparatus utilized for the production of coated, long fiber reinforcing composite structures.

Referring to FIG. 1, there is illustrated a schematic top view in elevation of a typical apparatus in which the novel process of the invention is conducted. The process may be characterized as a pultrusion process 10 wherein a mass of a first thermoplastic resin material in a flowable state having no discrete shape is extruded longitudinally through an elongated, first stationary impregnation die 11 while continuous reinforcing fiber strands 12 are a pulled through die 11 via puller assembly 18. Die 11 may be characterized as having a continuous, fully open central passage extending longitudinally therethrough, and a plurality of lobes projecting radially inwardly into the central passage from spaced apart locations along the length of the inside, opposite side walls of said central passage in interleaving relation to each other to form a convoluted passage in which the first thermoplastic resin material flows. The lobes function to allow individual fiber strands to be passed over at least one lobe such that the first thermoplastic resin material throughly impregnated the strands. Die 11 is attached to extruder 13 wherein the first thermoplastic resin material is heated and formed into a flowable mass. Continuous length of reinforcing fiber strands 12 are pulled through the central passage of die 11 and impregnated with the first thermoplastic resin material to produce the long fiber reinforcing composite structure 14. Optionally, while the first thermoplastic resin material is still in a flowable state, the impregnated strands are drawn through a metering device wherein the cross-sectional shape and diameter thereof may be defined to form the long fiber reinforcing composite structure. Thereafter, long fiber reinforcing composite structure 14 is pulled through a stationary coating die 15. Coating die 15 is attached to extruder 16 through which a second thermoplastic resin material and an additive material are heated and extruded through the die onto long fiber reinforcing composite structure 14. Optionally, a second metering device may be placed after coating die 15 to define the cross-sectional diameter of the coated, long fiber reinforcing composite structure 17 produced by the process. The coated, long fiber reinforcing composite structure 17 is cut into pellets at pelletizer 19.

Figure 2:
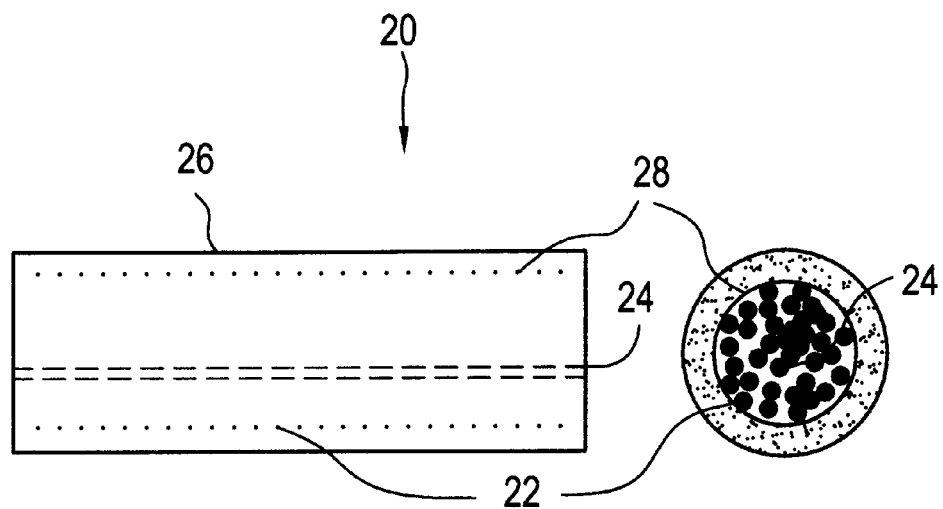
FIG. 2 is a view in elevation and cross section of a coated, long fiber reinforcing composite structure prepared according to the process.

Referring to FIG. 2, there is illustrated front and side views in elevation of a typical coated, long fiber reinforcing composite structure 20. Coated, long fiber reinforcing composite structure 20 is characterized as a long fiber reinforcing composite core member 22 having a plurality of continuous fiber strands 24 imbedded and extending therethrough parallel to the longitudinal axis of the structure. Core member 22 is composed of a first thermoplastic resin material of sufficient volume to completely impregnate and surround the continuous fiber strands 24. Coating member 26, characterized as a solidified, second thermoplastic resin material containing an additive material, which surrounds and encloses the surface of core member 22. An intermediate mixing zone 28, characterized as an interface of the first and second thermoplastic resin materials bond the first and second thermoplastic resin materials together to form an integral structure.

While it will be readily apparent to one skilled in the art that many thermoplastic resin materials, fibers and additive materials may be suitable for use in the process of the present invention to prepare coated, long fiber reinforcing composite structures, herein is described some processing conditions, resins, fiber, and additive materials suitable for use in the process.

Generally, the first thermoplastic resin material should exhibit high flow and low viscosity when heated and extruded through the impregnation die. It should not degrade when heated to temperatures in excess of the melt temperature which may be necessary to ensure complete impregnation of the fibers therewith. The first thermoplastic resin material may be selected from nylon 6, nylon 66, polyethylenes, polyacetals, polyphenylene sulfide, polyurethanes, polypropylene, polycarbonates, polyesters, acrylonitrile-butadiene-styrene, and combinations thereof.

The continuous lengths of fiber strands necessary to provide reinforcing qualities to the composite structure may be selected from glass, amorphous carbon, graphitic carbon, aramids, stainless steel, ceramics, alumina, titanium, magnesium, metal-coated carbons, rock wool and combinations thereof. Generally, the strands, obtainable in bundles of many filaments on spools, are generally separated by the lobes within the impregnation die and impregnated during the process. Optionally, the fiber strands may be heated prior to impregnation to increase strand separation from the bundle and improve impregnation.

The second thermoplastic resin material must be compatible with the first thermoplastic resin material. The two resins must exhibit compatible coefficients of thermal expansion as well as bonding forces so that the intermediate mixing zone is formed at the interface of the resins during the process of preparing the coated, long fiber reinforcing composite structure. The coefficients of thermal expansion of the two resin materials be should be within the same range of each other to ensure that the resin materials within the coated, long fiber reinforcing composite structure will expand and contract at the same rates. Otherwise, deformation of the composite structure may occur. The second thermoplastic resin material is a carrier of the additive material and should be readily mixable therewith. While the second thermoplastic resin material may be selected from nylon 6, nylon 66, polyethylenes, polyacetals, polyphenylene sulfide, polyurethanes, polypropylene, polycarbonates, polyesters, acrylonitrlle-butadiene-styrene, and combinations thereof, it is not essential that the first and second thermoplastic resin materials be identical. The second thermoplastic resin material should mix well with the additive material, bond with the first thermoplastic resin material, and exhibit a relatively low melt temperature so that a coating of the mixture will not cause melting of the first thermoplastic resin material of the long fiber reinforcing composite structure.

Additive materials are generally selected from components that provide enhanced molding properties as well as physical and chemical properties of shaped articles prepared therefrom. The additive materials may also be selected from components that are not suitable for incorporating into the first thermoplastic resin material due to their viscosity-increasing characteristics. It may be desirable to add pigments to the composite structure to reduce finishing labor of shaped articles, or it may be desirable to add a flame retardant agents to the composite structure to enhance the flame retarding features of the shaped article. Since many additive material are heat sensitive, an excessive amount of heat may cause them to decompose and produce volatile gases. Therefore, if a heat sensitive additive material is extruded with an impregnation resin under high heating conditions, the result may be a complete degradation of the additive material. Additive materials of the invention may be selected from mineral reinforcing agents, lubricants, flame retardants, blowing agents, foaming agents, ultraviolet light resistant agents, heat sensitive pigments, and combinations thereof. The mineral reinforcing agents may be selected from calcium carbonate, silica, mica, clays, talc, calcium silicate, graphite, wollastonite, calcium silicate, alumina trihydrate, barium ferrite, and combinations thereof.

The second thermoplastic resin-additive material composition is a blend of the second thermoplastic resin and additive materials. Generally, the composition may contain from about 10 to about 90 weight percent of the additive material and from about 90 to 10 weight percent of the second thermoplastic resin material. Typically, the second thermoplastic resin-additive material composition may contain from about 15 to about 85 weight percent of the additive material and from about 85 to about 15 weight percent of the second thermoplastic resin material, and preferably, from about 25 to about 75 weight percent of the additive material and from about 75 to about 25 weight percent of the second thermoplastic resin material. The composition may be prepared by melt bending the components in an extruder to form suitable mixtures of the components prior to feeding to the coating die of the process.

Generally, the first stationary, impregnation die of the present invention is operated at temperatures that are sufficient to cause melting and impregnation of the first thermoplastic resin material onto the long fiber reinforcing strands. Typically, the operation temperatures of the impregnation die is higher that the melt temperature of the first thermoplastic resin material, and preferably, the impregnation die is operated at temperatures of from about 400° to about 800° F. Generally, the second stationary, coating die of the invention is operated at temperatures sufficient to ensure melting of the second thermoplastic resin-additive material blend without degradation of the additive material in the blend. Typically, the coating die is operated at temperatures of from about 250° to about 700° F.

Generally, shaped articles are prepared from pellets of coated, long fiber reinforcing composite structures by molding processes. The pellets are placed in an extruder-die assembly and molded into the shaped articles. Since pigments and other agents may be applied to the composite structure during the coating portion of process, there is little need for finishing or applying additives to the surface of the shaped article.

We claim:

1. A process for the continuous preparation of a coated, long fiber reinforced composite structure suitable for the preparation of shaped articles, comprising the steps of:

a. extruding a mass of a first thermoplastic resin material in a flowable state having no discrete shape into and longitudinally through an elongated, first stationary die having no relatively movable components, said first die having a continuous fully open central passage extending longitudinally therethrough, and a plurality of lobes projecting radially inwardly into said central passage from spaced apart locations along the length of the inside, opposite side walls of said central passage in interleaving relation to each other to form a convoluted passage through which said first thermoplastic resin material flows;

b. introducing a plurality of continuous lengths of reinforcing fiber strands into said first die central passage at different locations therein simultaneously while said mass of first thermoplastic resin in a flowable state is extruded thereinto;

c. separately passing each of said fiber strands longitudinally within and along the length of said central passage over and between said interleaving lobes in the presence of said mass of first thermoplastic resin material to thoroughly contact and impregnate each of said fiber strands with said first thermoplastic resin material to produce a long fiber reinforced composite structure;

d. continuously withdrawing the long fiber reinforced composite structure from said first die longitudinally thereto, wherein the long fiber reinforced composite structure is characterized as containing continuous fiber strands imbedded and extending in said first thermoplastic resin material generally parallel to the longitudinal axis of the structure;

e. continuously extruding a mass of a second thermoplastic resin material and an additive material to produce a second thermoplastic resin-additive material, wherein said second thermoplastic resin-additive material is in a flowable state having no discrete shape, into and longitudinally through an elongated, second stationary die having no relatively movable components, said second stationary die having a continuous, fully open central passage extending longitudinally therethrough to form a passage through which said second thermoplastic resin-additive material flows;

f. continuously conveying the long fiber reinforced composite structure into and through said second die central passage simultaneously while said second thermoplastic resin-additive material is extruded thereinto;

g. contacting and coating the long fiber reinforced composite structure with the second thermoplastic resin-additive material to produce a coated, long fiber reinforced composite structure, wherein the first and second thermoplastic resin materials are bonded at the first and second thermoplastic resin material interface;

h. continuously withdrawing the coated, long fiber reinforced composite structure from the second die; and i. cutting the coated, long fiber reinforced composite structure into pellets, wherein the temperature of the first stationary die is sufficient to melt and impregnate the first thermoplastic resin material onto the continuous length of reinforcing fiber strands.

2. The process according to claim 1, wherein the temperature of the first stationary die is at least about 150° F. higher that the melt temperature of the first thermoplastic resin material.

3. The process according to claim 2, wherein the temperature of the first stationary die is from about 400° to about 800° F.

4. The process according to claim 3, wherein the second stationary die is at a temperature sufficient to coat the second thermoplastic resin-additive material onto the long fiber reinforced composite structure without degradation of the additive material.

5. The process according to claim 4, wherein the second stationary die is at a temperature of from about 250° to about 700° F.

6. The process according to claim 5, wherein the first and second thermoplastic resin materials are selected from the group consisting of nylons, polyethylenes, polyacetals, polyphenylene sulfide, polyurethanes, polypropylene, polycarbonates, polyesters, acrylonitrile-butadiene-styrene, and combinations thereof.

7. The process according to claim 6, wherein the continuous length of fiber strands are selected from the group consisting of glass, amorphous carbon, graphitic carbon, aramids, stainless steel, ceramics, alumina, titanium, magnesium, metal-coated carbons, rock wool and combinations thereof.

8. The process according to claim 7, wherein the additive material is selected from the group consisting of heat sensitive pigments, mineral reinforcing agents, lubricants, flame retardants, blowing agents, foaming agents, ultraviolet light resistant agents and combinations thereof.

9. The process according to claim 8, wherein the mineral reinforcing agents are selected from the group consisting of calcium carbonate, silica, mica, clays, talc, calcium silicate, graphite, wollastonite, calcium silicate, alumina trihydrate, barium ferrite, and combinations thereof.

10. The process according to claim 9, wherein the first and second thermoplastic resin materials exhibit compatible coefficients of thermal expansion to ensure that the materials will expand and contract at the same rate.

11. A pultrusion process for the continuous preparation of a coated, long fiber reinforcing composite structure, characterized by extruding a mass of a first thermoplastic resin material in a flowable state into an impregnation die while continuously conveying a plurality of continuous lengths of reinforcing fiber strands through the die simultaneously while extruding the mass of first thermoplastic resin material thereinto, contacting and impregnating each reinforcing fiber strand with the first thermoplastic resin material within the impregnation die to produce a long fiber reinforced composite structure, the improvement comprising the steps of:

a. heating a thermoplastic resin blend comprised of a second thermoplastic resin material and an additive material to a temperature sufficient to produce a flowable second thermoplastic resin-additive material blend without degradation of the blend;

b. extruding the second thermoplastic resin-additive material blend into a stationary coating die having no relatively movable components, said coating die having a continuous, fully open longitudinally extending central passage through which said second thermoplastic resin-additive material blend flows;

c. continuously withdrawing the long fiber reinforced composite structure from the impregnation die and continuously conveying the long fiber reinforced composite structure into and through said coating die central passage;

d. contacting the long fiber reinforced composite structure with the second thermoplastic resin-additive material blend simultaneously while the long fiber reinforced composite structure is continuously conveyed into and through said coating die to form within said coating die an outer coating of the second thermoplastic resin-additive material blend surrounding the long fiber reinforced composite structure to produce a coated, long fiber reinforced composite structure;

e. continuously withdrawing the coated, long fiber reinforced composite structure from the coating die; and f. cutting the coated, long fiber reinforced composite structure into pellets.

12. The process according to claim 11, wherein the stationary coating die is operated at a temperature of from about 250° to about 700° F.

13. The process according to claim 12, wherein the first and second thermoplastic resin materials are selected from the group consisting of nylons, polyethylenes, polyacetals, polyphenylene sulfides, polycarbonates, polyurethanes, polyesters, acrylonitrile-butadiene-styrene, and combinations thereof.

14. The process according to claim 13, wherein the continuous length of reinforcing fiber stands are selected from the group consisting of glass, amorphous carbon, graphitic carbon, aramids, stainless steel, ceramics, alumina, titanium, magnesium, metal-coated carbons, rock wool and combinations thereof.

15. The process according to claim 14, wherein the additive material is selected from the group consisting of heat sensitive pigments, flame retardants, blowing agents, foaming agents, ultraviolet light resistant agents, lubricants, mineral reinforcing agents and combinations thereof.

16. A continuous pultrusion process for forming a thermoplastic coated, long fiber reinforced composite structure having a core formed of a bundle of long fibers impregnated with a first thermoplastic resin and a coating formed of a second thermoplastic resin, different from the first thermoplastic resin, surrounding the core, the continuous pultrusion process comprising the steps of:

(a) continuously drawing a continuous length bundle of reinforcing fibers sequentially through an elongate, open-ended impregnation die cavity of an upstream impregnation die, and then through an elongate, open-ended coating die cavity of a downstream coating die;

(b) extruding a molten flow of a first thermoplastic resin into the impregnation die cavity simultaneously while the continuous length bundle of reinforcing fibers is continuously drawn therethrough;

(c) causing the molten flow of first thermoplastic resin to contact and impregnate the continuous length bundle of reinforcing fibers within the impregnation die cavity and thereby form a long fiber reinforced composite structure which is continuously withdrawn from the upstream impregnation die cavity and continuously introduced into, and drawn through, the downstream coating die cavity;

(d) extruding a molten second thermoplastic resin, different from the first thermoplastic resin, into the downstream coating die cavity simultaneously while the long fiber reinforced composite structure is being continuously drawn therethrough to coat the long fiber reinforced composite structure with a coating of the second thermoplastic resin thereby forming the coated, long fiber reinforced composite structure; and (e) continuously withdrawing the coated, long fiber reinforced composite structure from the downstream coating die.

17. The process of claim 16, further comprising (f) cutting the coated, long fiber reinforced composite structure into pellets.

18. The process of claim 16, wherein after step (c), there is practiced the step of passing the long fiber reinforced composite structure through a first metering device so as to define cross-sectional shape and diameter of the long fiber reinforced composite structure.

19. The process of claim 16, 17 or 18, wherein after step (d) there is practiced the step of passing the coated, long fiber reinforced composite structure through a second metering device so as to define cross-sectional shape and diameter of the coated, long fiber reinforced composite structure.

20. The process of claim 16, wherein said second thermoplastic resin includes additives.

21. The process of claim 16, wherein said step (d) is practiced to form a coated, long fiber reinforced composite structure having an annular interfacial zone between the core and the coating thereof which includes a mixture of the first and second thermoplastic resins.

* * * * *